(12) United States Patent
Lee

(10) Patent No.: US 11,035,964 B1
(45) Date of Patent: Jun. 15, 2021

(54) METHOD AND APPARATUS FOR RADIATION DETECTION BASED ON TIME-OF-FLIGHT WITHIN OPTICAL FIBERS

(71) Applicant: JEFFERSON SCIENCE ASSOCIATES, LLC, Newport News, VA (US)

(72) Inventor: Seung Joon Lee, Poquoson, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 0 days.

(21) Appl. No.: 16/861,753

(22) Filed: Apr. 29, 2020

(51) Int. Cl.
*G01T 1/20* (2006.01)
*G02B 6/255* (2006.01)

(52) U.S. Cl.
CPC ............ *G01T 1/201* (2013.01); *G01T 1/2006* (2013.01); *G02B 6/255* (2013.01)

(58) Field of Classification Search
CPC ........ G01T 1/201; G01T 1/2006; G02B 6/255
See application file for complete search history.

(56) References Cited

U.S. PATENT DOCUMENTS

| | | | | |
|---|---|---|---|---|
| 5,880,475 A | * | 3/1999 | Oka | ........................ G01T 1/201 250/483.1 |
| 2013/0092846 A1 | * | 4/2013 | Henning | ............ G01N 21/6408 250/458.1 |
| 2021/0103060 A1 | * | 4/2021 | Brodsky | ................. G01T 1/201 |

* cited by examiner

*Primary Examiner* — Hugh Maupin

(57) ABSTRACT

A radiation detection system using time of flight (TOF) information within multiple optical fiber complexes coupled with a scintillating material at intersections of repeatedly crossing over shape. Light detectors are placed at the ends of each fiber to detect scintillation events. A timing processor is collecting light detector signal to compute TOF difference and estimate the location and strength of radioactivity. The system is scalable in one dimension, capable of being shaped or curved, and customizable in terms of special resolution and sensitivity. The system is suitable for long range and coarse radiation detection.

20 Claims, 6 Drawing Sheets

METHOD AND APPARATUS FOR RADIATION DETECTION BASED ON TIME-OF-FLIGHT WITHIN OPTICAL FIBERS

This invention was made with government support under Management and Operating Contract No. DE-AC05-06OR23177 awarded by the Department of Energy. The United States Government has certain rights in the invention.

FIELD OF THE INVENTION

This invention is relates to a time of flight (TOF) radiation detection device and method. More specifically, the present invention relates to a TOF radiation detection system that utilizes wavelength-shifting fibers and optical fibers.

BACKGROUND OF THE INVENTION

Conventional optical radiation detectors consist of radiation sensitive scintillating materials that emit light upon interaction with ionizing radiation. The emitted light is then delivered to a light detector directly or indirectly through an optical guide such as a waveguide or optical fiber. The light detector converts light intensity to an electrical signal to be processed with an electrical circuit to quantify the time and amount of the ionizing radiation.

Typical methods for expanding the spatial range of detection include combining multiple detectors such as building a two-dimensional (2D) array of detectors to capture radiation images or placing multiple detectors at desired locations to monitor a wider range. In conventional radiation detection systems, detecting radiation events at multiple spots typically requires the building and installation of multiple detector systems at all desired detection locations to increase the number of recorded events.

One such example of this need is the need to monitor the leakage of radiation material around a radiation material storage area in which the level of there is no radioactivity or the amount of radioactivity is very small. Covering a large detection area with conventional radiation detectors requires building and placing multiple detectors at many locations around the storage area. Hence the overall cost of the detection system is proportional to the number of detectors which is cost prohibitive.

Another conventional method of monitoring leakage of radioactive material involves surveying all around the storage area at regular intervals using a single high sensitivity radiation detector. Unfortunately this method requires continuous human monitoring making it cost prohibitive or, in case of expected high radiation dose rates, unfeasible. In addition, radiation surveys may not be possible for underground leakage rather than open area leakage.

Accordingly, it would be beneficial to provide a cost effective radiation detector that is capable of detecting and locating radioactive material in any circumstance including in large areas, underground, or underwater.

BRIEF SUMMARY OF THE INVENTION

The present invention is a radiation detector including repeatedly crossing over optical fiber complexes with a volume of scintillating material at the cross over points. A wavelength-shifting fiber is used as the optical fiber inside of the scintillating material in order to maximize the light generation efficiency delivered from the scintillator to the optical fiber. Since the light attenuation of wavelength-shifting fiber is much higher than the light attenuation of conventional optical fibers, the total length of wavelength-shifting fiber is minimized.

The wavelength-shifting fiber is spliced (welded) to regular optical fibers on each side that in turn interconnect to the wavelength-shifting fiber at the next intersection. The interconnecting optical fibers have different lengths or different indexes of refraction to provide a difference in time of flight (TOF) within a single interconnecting fiber. When light travels through multiple interconnecting fibers, a difference in TOF will increase by the distance of travel length. As a result, when using two optical fibers, the difference between TOF for each fiber can be used to determine the location of scintillation.

One end of each optical fiber is coupled to a light detector to generate an electrical signal that is delivered to a timing processor. The timing processor compares TOF of two (or more) signals from each detector to determine the location of the discrete scintillation events.

As long as the light detector can capture the light signal and the TOF difference can be resolved, the detector system can be arranged to have any required length and any required spatial resolution. Moreover, extending the detector system length does not increase the number of detectors and as a result provides a cost effective system as compared to convention radiation detectors.

Optical fiber characteristics such as flexibility, low attenuation, long lifetime, resistance to corrosive materials, immunity to electromagnetic fields, and water resistance enable the radiation detector of the present invention to be used in in difficult or hazardous environments that cannot be monitored by conventional radiation detectors.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION OF THE INVENTION

In its most basic form, the present invention provides a novel radiation detection method and apparatus for detecting and locating radioactive material. The detection apparatus includes multiple optical fiber complexes repeatedly intersecting each other. The time of flight (TOF) between each intersection is different from each other resulting in a TOF difference among optical fiber complexes. The TOF differences can be used to determine the location of scintillation and thus the location of the radiation.

Figure 1:
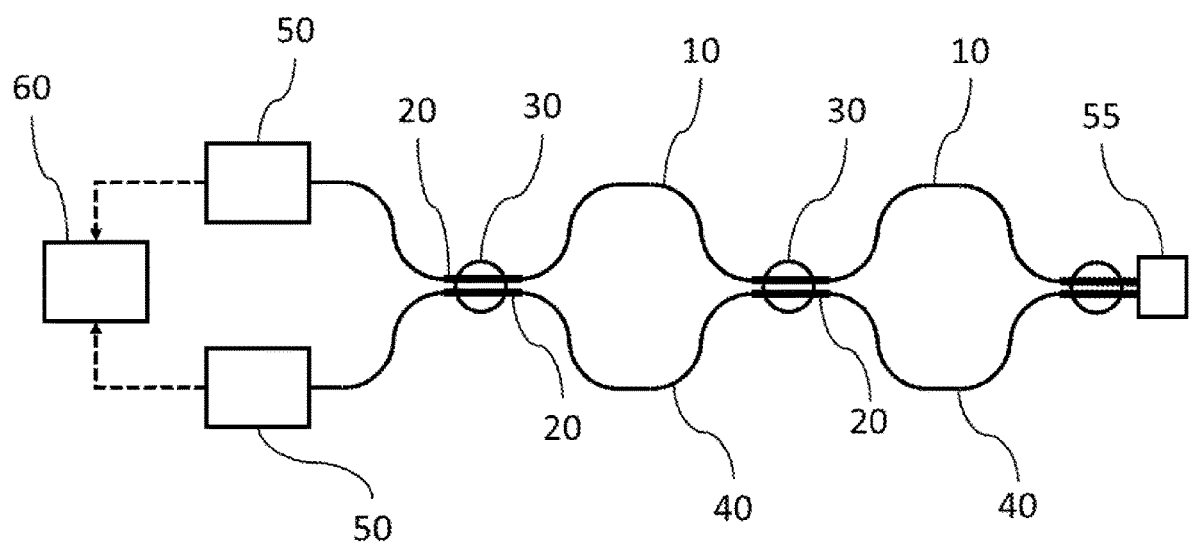
FIG. 1 is a schematic depicting a time of flight (TOF) optical fiber radiation detector using refractive index variation.

FIG. 1 illustrates a first embodiment of the invention. The radiation detection device is constructed of two optical fiber complexes that include regular optical fibers and wavelength-shifting fibers. In detail, a first fiber complex (upper position) consists of optical fibers 10 that interconnect multiple wavelength-shifting fibers 20. The wavelength-shifting fibers 20 are covered by a volume of scintillating material 30 at each location. A second fiber complex (lower position) includes optical fibers 40 that interconnect the same type of wavelength-shifting fibers 20 which are also covered by a volume of scintillating material 30. The optical fibers and wavelength-shifting fibers in each complex are joined end-to-end and spliced to minimize light loss. The wavelength-shifting fibers have similar core diameter with the interconnecting optical fibers but are represented as thicker lines in the FIG. 1 in order to enhance understanding of the invention.

The lower interconnecting fibers 40 have the same length as the upper interconnecting fibers 10 but preferably have a slightly different refractive index than the upper interconnecting fiber 10. Since the light speed in a material changes by the refractive index of the material, the light travel time also changes by the refractive index at the same distance.

When scintillation occurs due to an ionizing radiation, the scintillator 30 will emit a plurality of photons that will travel into the wavelength-shifting fibers 20. The wavelength-shifting fibers then capture scintillated photons and re-emit lower energy photons, such as capturing ultraviolet light and releasing green light. This wavelength-shifting process will increase the efficiency of the light output by transmitting wavelength shifted light along the axial direction of the optical fiber.

When a wavelength-shifting process occurs for both wavelength-shifting fibers 20 in a single scintillator 30, wavelength shifted light will travel through both interconnecting optical fibers 10 and 40 to the end of the fiber that is coupled to a light detector 50, respectively. The light detector 50 may be a photomultiplier tube (PMT), a silicon photomultiplier (SiPM), or single photon avalanche photodiode (SPAD). The most preferable light detector is the SPAD due to its price, excellent timing resolution, and sensitivity. At each intersection of optical fiber complex, a volume of scintillator 30 is glued to the wavelength-shifting fibers 20 or otherwise secured in place using a transparent material.

The opposing ends of each fiber complex are covered by a light absorber 55 to minimize light reflection back to the light detector 50 in order to minimize potential noise signals. Depending on the desired application, the light absorber 55 can be replaced with another set of light detectors for each fiber in order to create more accurate arrival time measurements.

Depending on the refractive index used for the interconnecting optical fibers 10 and 40, there would be a TOF difference which will be used to determine the exact location of the scintillation. A timing processor 60 will be used to receive electric signals from the light detectors 50 and compute the TOF difference. The timing processor 60 determines the TOF difference from theoretical and experimental calibration that is expected to be a linear relationship between time difference and distance to the scintillation. Scintillation at the closer location to the light detector would make a small TOF difference while scintillation at the farther location would make large TOF difference.

Figure 2:
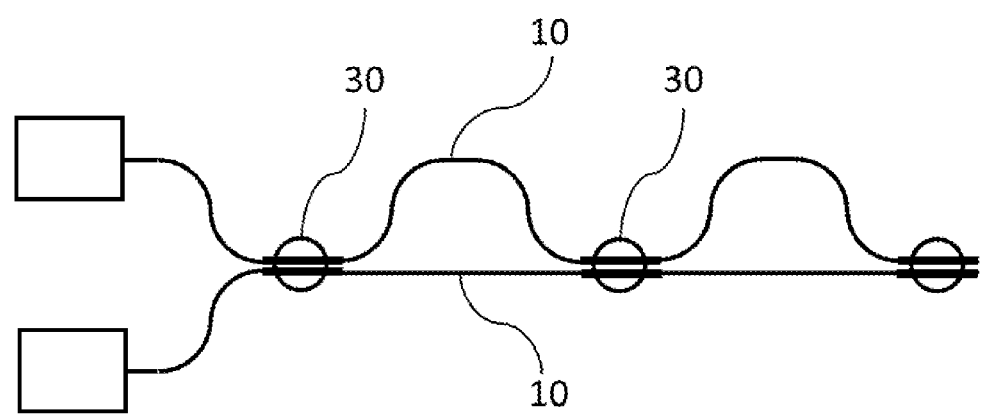
FIG. 2 is a schematic of a second embodiment of using optical fiber length variation.

With reference to the second embodiment in FIG. 2, two interconnecting optical fibers 10 have the same refractive index but different lengths between scintillators 30 so that the TOF within the each section is different for each fiber complex. Thus the difference of TOF for two optical fiber complexes changes by the location of scintillation. In a radiation detector which requires a specific type of interconnecting optical fiber for all fiber complexes, the preferred solution is to change the length of optical fiber to create a TOF difference. As an example, when using a common optical fiber that has a core refractive index of 1.5, a difference of 1 meter in fiber length will provide a 5 nanosecond difference in TOF, although it must be taken into account that adding more distance on one fiber requires a certain degree of bending or coiling on one fiber complex which in turn may increase light loss within the optical fiber resulting sensitivity and accuracy loss.

Figure 3:
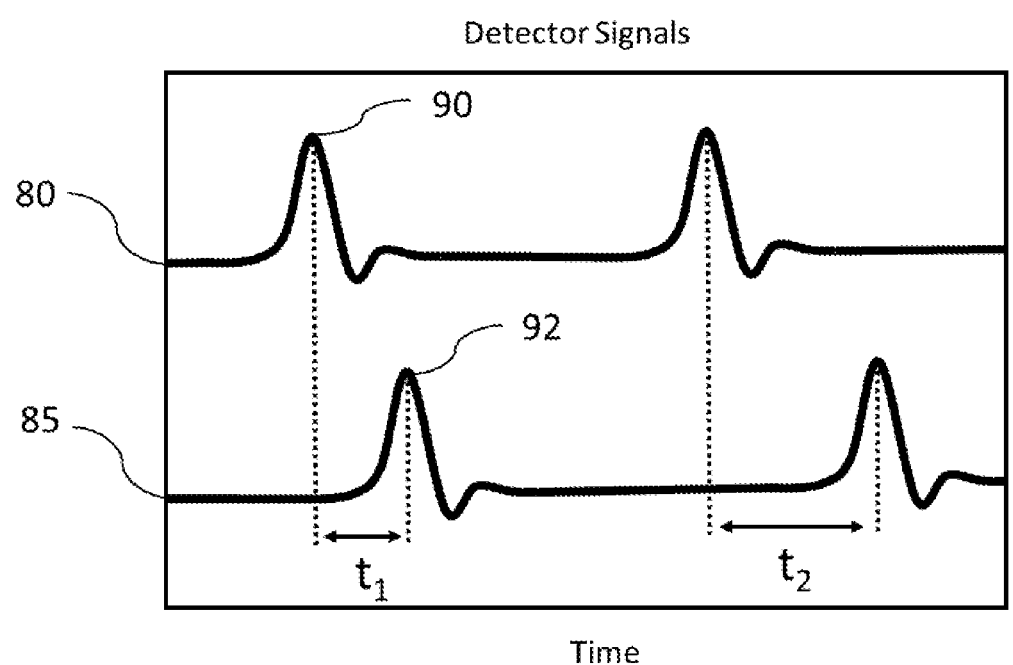
FIG. 3 is an example plot of electrical signals from two light detectors.

Referring to the FIG. 3, the upper plot represents the detector signal from the fiber complex with low refractive index 80. The lower plot represents the detector signal from the fiber complex with high refractive index 85. When there is a scintillation event at the scintillator located closer to the detector, the light traveling through an optical fiber with low refractive index will arrive at the detector first 90 and the light traveling through an optical fiber with high refractive index will arrive at the detector later 92. The TOF difference $t_1$ can be measured by digitizing both signals in terms of timing and calculating the difference between the two signals.

When there is a scintillation event at the scintillator located farther from the detector, TOF difference $t_2$ will be increased compared to the TOF difference $t_1$ because the overall travel distance is increased for both fiber complexes. Therefore, the TOF difference of two optical fiber complexes is proportional to the distance between the detector and scintillator. From the relationship which is computed by experimental calibration, the system can predict the exact location of the scintillation in order to determine the location of the radiation.

Figure 4:
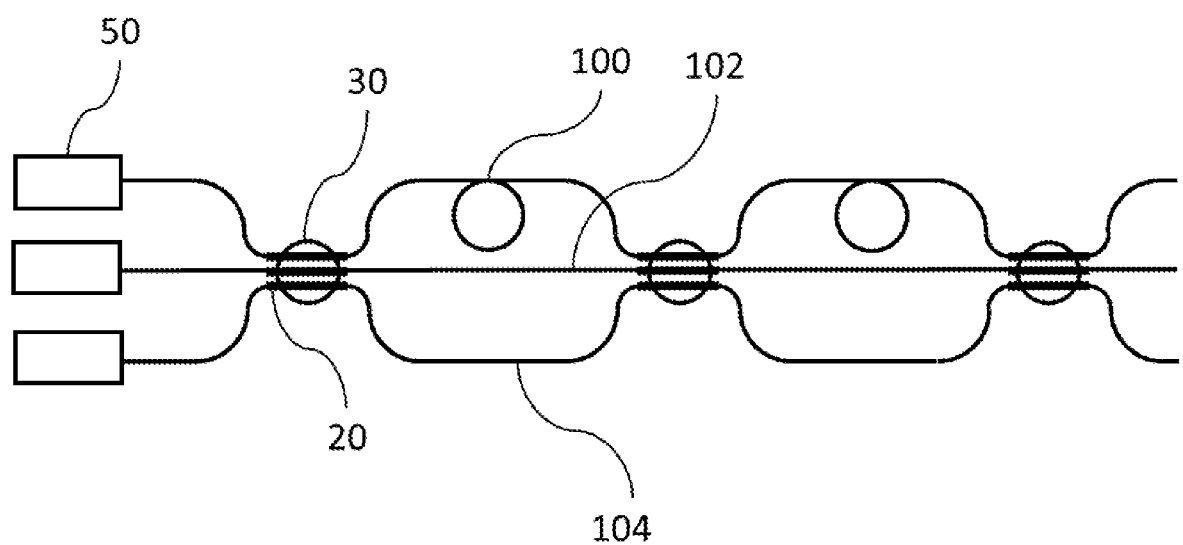
FIG. 4 is a schematic of a third embodiment of the invention using three optical fibers.

With reference to the a third embodiment of the invention in FIG. 4, three optical fiber complexes include interconnecting fibers 100, 102, and 104 with the same refractive index but having different lengths, which will generate a TOF difference between each fiber complex. A separate light detector 50 is required for each optical fiber complex. FIG. 4 represents the "changing length" method described hereinbefore.

Generation of a TOF difference also can be made by using three interconnecting fibers with different refractive index to change the light speed within the optical fiber. Between the "changing length" method and "changing refractive index" method to generate TOF difference, it is preferable to use the "changing refractive index" method because it requires the same length of fibers, making it easy to form long and straight fiber complexes.

Instead of using two optical fiber complexes, using three (or more) optical fiber complexes will provide better statistics and improve the signal to noise ratio, however, it will increase overall manufacturing cost of the detector system.

Figure 5:
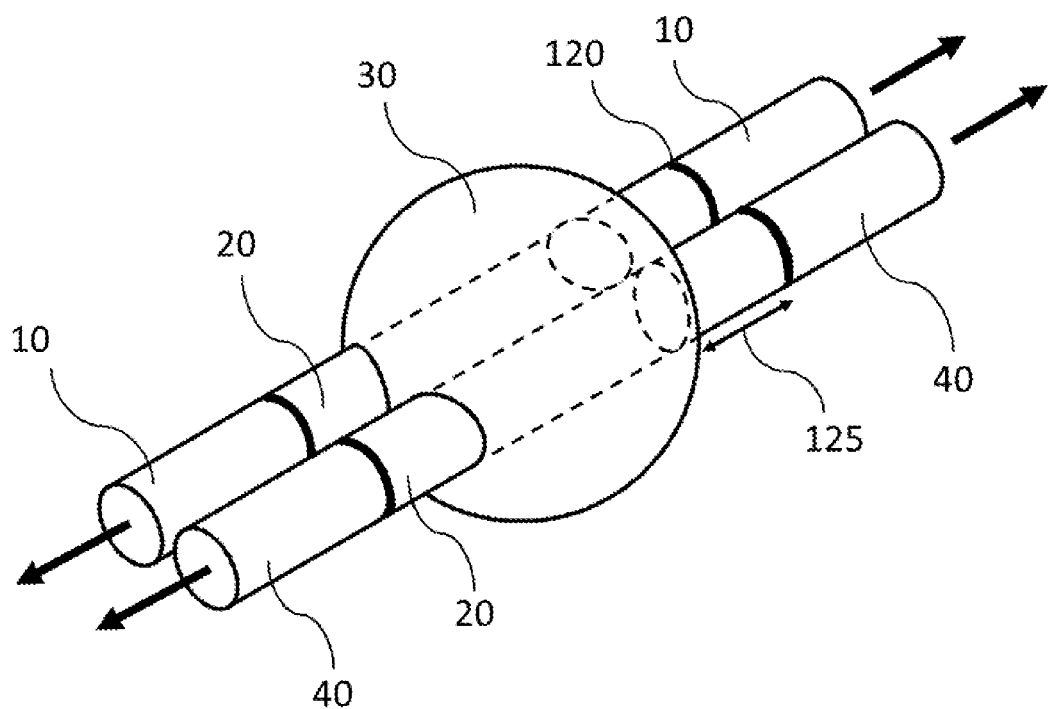
FIG. 5 is a perspective view of an optical fiber complex at an intersection with a scintillator.

With reference to FIG. 5, two wavelength-shifting fibers 20 are embedded in a scintillator 30. The scintillator can be any shape but is most preferably a spherical shape to maximize total internal reflection and light transport into the wavelength-shifting fibers. The scintillator is covered by a light reflective thin film or coating to minimize the light loss (not shown). The wavelength-shifting fiber is joined at a splice 120 to interconnecting optical fibers 10 and 40 to transport light to light detectors. The preferred method of joining two optical fibers is fusion splicing which is the process of fusing or welding two fiber ends together by an electric arc. Fusion splicing is the most widely used method as it provides low light loss, low light reflectance, and creates a strong mechanical joint.

As described hereinbefore, the light attenuation of wavelength-shifting fiber 20 is much higher than interconnecting fibers 10 and 40. To minimize the light attenuation, it is preferable to minimize the length of the wavelength-shifting fiber outside of the scintillator 125. Preferably, the length 125 outside of the scintillator needs to be long enough to be placed in a splicing machine or preferably between 1.5 and 2.5 centimeters in length. An alternative means to assemble the detector system is to splice all joints first to complete the required number of optical fiber complexes and subsequently place and secure scintillators at desired intersections. An alignment process is followed if the total length of the detector system is long.

Due to the light propagation mechanism, it is not necessary to have both wavelength-shifting fibers 20 contact each other within or outside of a scintillator. However, it is most preferable to provide a symmetric placement within a scintillator to impart similar light conversion efficiencies to both wavelength-shifting fibers.

Although FIG. 5 depicts a parallel alignment of two optical fibers, the angle between two wavelength-shifting fibers can be any angular degree but parallel alignment is preferable to avoid any bending of optical fibers.

Figure 6:
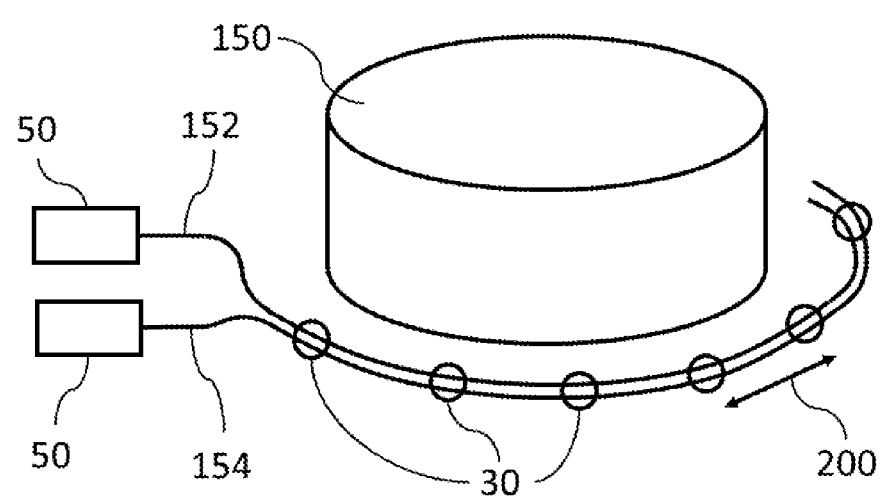
FIG. 6 is an example application of the invention to monitor radiation around a radioactive material storage area.

FIG. 6 illustrates two fiber complexes with the same length but different refractive indexes placed around a radioactive storage area 150. Each fiber complex 152, 154 is coupled to a light detector 50 and connected to a timing processor (not shown) to measure the TOF difference. Six scintillators 30 are arranged to cover an equal space, which is a half circle of the storage area 150. The detector system is extended to cover the entire storage area. The distance between two adjacent scintillators 200 is equal in order to form a uniform distribution. It is not required to have equal spacing between scintillators, but required to have a minimum spacing 200 depends on the time resolution of a timing processor. This example demonstrates the potential of the present invention to monitor radiation over a large coverage area or length using only two optical fiber complexes each having two light detectors and a timing processor to detect and locate radioactive material.

The theoretical analysis of the present invention is as follows:
In general terms, the speed of light within a material can be defined as $$c_m = c_0/n$$

where $c_m$ is the speed of light within a specific material with a refractive index n and the speed of light in a vacuum is $c_0$. Therefore, TOF t within a specific optical fiber is defined as $$t = n^* d/c_0 \quad (1)$$

where n is the refractive index of the fiber core, d is the optical fiber length, and $c_0$ is the speed of light in a vacuum. Therefore, TOF difference $t_{diff}$ for two optical fibers with the same length and with distinctive refractive index is given by $$t_{diff} = (n_1 - n_2)^* d/c_0 \quad (2)$$

where $n_1$ and $n_2$ are the refractive indexes for each optical fiber, d is the optical fiber length, and $c_0$ is the speed of light in a vacuum. Therefore, TOF difference is proportional to the difference of the refractive indexes of two optical fibers and the total travel distance.

As an example, a radiation detector using two optical fiber complexes and scintillators is constructed according to the invention. The refractive index of commercially available optical fiber varies from about 1.45-1.65. To simplify the computation, two optical fibers with refractive index 1.4 and 1.7 (0.3 difference) were used for interconnecting fibers. A polyvinyltoluene-based plastic scintillator bead with a diameter of 1 cm is used. The bead is sensitive to gamma ray and scintillating UV-blue light. The scintillator bead covers two short lengths of wavelength-shifting fibers which absorb blue light and subsequently release green light. Each wavelength-shifting fiber is spliced (laser welded) to interconnecting optical fibers. The interconnecting optical fiber at one side is coupled to a light detector that is sensitive to green light. The total length of wavelength-shifting fiber is ignored for a simplified calculation.

Each bead is covered by a thin reflective film such as TEFLON® to serve as light shielding. The entire radiation detection system, including interconnecting fibers, wavelength-shifting fibers, scintillator beads, and light detectors are covered by a thin shielding and supporting material such as heat shrink tubing which blocks ambient light and supports the whole system mechanically.

From equation (2) hereinabove, the TOF difference from two fibers with a length of 1 meter is $$t_{diff} = 0.3 * 1/(3 \times 10^8) = 1 \text{ ns}$$

By a simple calculation, scintillation at the first scintillator from the light detector will generate 1 ns TOF difference and scintillation at the second scintillator from the light detector will generate 2 ns TOF difference. The TOF difference at other scintillator locations will change accordingly.

To measure the TOF difference, a time-to-digital converter (TDC) is preferably used. The TDC digitize the timing of the signal and measures the exact peak timing. It also compares multiple signals and provides TOF differences. Commercially available high-end TDCs can resolve 10 picoseconds or less which is good enough to resolve a 1 nanosecond TOF difference.

Optical fiber is a most preferred communication device to deliver light at a long distance. Due to its high efficiency to deliver the light, it can be used for very long distance (over 100 km) communication. It is mechanically strong and has minimal degradation. Moreover, it can be bent to a certain degree without causing significant light loss, which, since an adaptive shaping of detector line is required, is an advantageous property for use in the present invention.

There are many commercial applications that require radiation detection in a variety of geometries in terms of shape and length. The present invention is easily scalable to a required length and is capable of being shaped without adding more detectors.

Current markets for this technology include large-scale radiation monitoring instrumentation. The detection system can offer tremendous flexibility in this area. As an example, the optical fiber complex sensor would allow detection of low levels of radioactive material in locations deep underground such as areas surrounding nuclear waste storage sites or nuclear reactors. The system would provide detection of any low level radioactive leaks that may be migrating through the soil. The detection system can quantify and locate the leaking radiation level. It can also provide radiation detection for environmental monitoring such as water supply systems, ground water quality, or contamination.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. A radiation detection system comprising:
   a plurality of optical fiber complexes each including a plurality of wavelength-shifting fibers and a plurality of optical fibers interconnecting each of said wavelength-shifting fibers;
   a light detector at one end of each of said optical fiber complexes;
   a light absorber at the opposing end of each of said optical fiber complexes;
   said wavelength-shifting fibers of said optical fiber complexes including cross over points; and
   a volume of scintillating material at the cross over points to emit scintillated light to be detected by said light detectors.

2. The radiation detection system of claim 1, wherein each of said optical fibers in each complex includes a different length to provide a difference in time of flight (TOF) within a single interconnecting fiber.

3. The radiation detection system of claim 1, wherein each of said optical fibers includes a different refractive index to provide a difference in time of flight (TOF) within a single interconnecting fiber.

4. The radiation detection system of claim 1, wherein said optical fibers include the same core diameters.

5. The radiation detection system of claim 1, comprising said wavelength-shifting fibers and said optical fibers include splices to join the fibers together end-to-end.

6. The radiation detection system of claim 5, wherein said splices are electric arc welded splices.

7. The radiation detection system of claim 5 wherein the splices are between 1.5 and 2.5 centimeters in length.

8. The radiation detection system of claim 1, wherein said light detector is selected from the group consisting of photomultiplier tube (PMT), a silicon photomultiplier (SiPM), and single photon avalanche photodiode (SPAD).

9. The radiation detection system of claim 1, further comprising a timing processor connected to said light detector on each of said optical fiber complexes.

10. The radiation detection system of claim 1, comprising said volume of scintillator material is secured to the wavelength-shifting fibers with a transparent material.

11. The radiation detection system of claim 10, comprising said volume of scintillator material is a spherical shape.

12. The radiation detection system of claim 1, wherein said scintillator includes a light reflective coating to minimize the light loss from the scintillator.

13. The radiation detection system of claim 1, comprising:
   said wavelength-shifting fibers and said optical fibers include a light attenuation; and
   the light attenuation of the wavelength-shifting fibers is higher than the light attenuation of the optical fibers.

14. The radiation detection system of claim 1 wherein said wavelength-shifting fibers include a symmetric placement within the volume of scintillator material to impart similar light conversion efficiencies to the wavelength-shifting fibers.

15. The radiation detection system of claim 1 comprising a parallel alignment between wavelength-shifting fibers within said volume of scintillating material.

16. A method of measuring radiation, comprising:
   providing a plurality of optical fiber complexes each including a plurality of wavelength-shifting fibers and a plurality of optical fibers having same length and with distinctive refractive index;
   welding the ends of said wavelength-shifting fibers and said optical fibers together by an electric arc;
   optically coupling a light detector at one end of each of said optical fiber complexes;
   optically coupling a light absorber at the opposing end of each of said optical fiber complexes;
   forming cross over points between the wavelength-shifting fibers of the optical fiber complexes;
   covering the cross over points with scintillating material to emit scintillated light to be detected by said light detectors; and
   determining the time of flight (TOF) difference $t_{diff}$ between each optical fiber complex by the relationship $t_{diff}=(n_1-n_2)*d/c_0$ where $n_1$ and $n_2$ are the refractive indexes for each optical fiber, d is the optical fiber length, and $c_0$ is the speed of light in a vacuum.

17. The method of claim 16, comprising capturing scintillated photons from the volumes of scintillator material with the wavelength-shifting fibers.

18. The method of claim 17, comprising re-emitting lower energy photons with the wavelength-shifting fibers.

19. The method of claim 18, comprising increasing the efficiency of the light output by transmitting wavelength-shifted light along the axial direction of the optical fiber.

20. A radiation detection system comprising:
   at least two optical fiber complexes, having repeated interconnection;
   a first optical fiber complex comprising a plurality of wavelength-shifting fibers and a plurality of optical fibers including the same core refractive index interconnecting said wavelength-shifting fibers;
   a light detector coupled to one end of said first optical fiber complex and a light absorber to the opposite end of said first optical fiber complex;
   a second optical fiber complex comprising a plurality of wavelength-shifting fibers having different refractive indexes than the optical fibers of the first optical fiber complex;
   a light detector coupled to one end of said second optical fiber complex and a light absorber to the opposing end of said second optical fiber complex;
   said second optical fiber complex aligned in the same direction as the said first optical fiber complex; and
   a scintillating material covering both the wavelength-shifting fiber in said first optical fiber complex and the wavelength-shifting fiber in said second optical fiber complex to emit scintillated light into both said first and second optical fiber complexes to be detected by said light detectors.

* * * * *